Patented Dec. 1, 1931

1,834,089

UNITED STATES PATENT OFFICE

PAUL JOHNSON CARLISLE, OF NIAGARA FALLS, NEW YORK, ASSIGNOR, BY MESNE ASSIGNMENTS, TO THE ROESSLER & HASSLACHER CHEMICAL COMPANY, A CORPORATION OF DELAWARE

VAPOR PHASE PROCESS FOR ALKYL CHLORIDES

No Drawing.     Application filed March 14, 1928.   Serial No. 261,704.

This invention relates to the preparation of alkyl chlorides from the corresponding alcohols by reaction with hydrogen chloride. The object of this invention is the synthesis of primary alkyl chlorides of the lower alcohols in a gas phase reaction between the alcohol and hydrogen chloride in the presence of a catalyst. Such a process avoids the corrosion effects of the previously proposed liquid phase processes.

My process will be described herein with special reference to the manufacture of methyl chloride from methanol and hydrogen chloride utilizing previously ignited alumina gel as a catalyst. However, this process is also applicable to the preparation of other alkyl chlorides, such as ethyl chloride and to the utilization of alumina in general. In investigating the subject to which this invention relates, I have found that certain other materials will catalyze the exchange of alcoholic hydroxyl for the chlorine of hydrogen chloride to varying degrees. Specific mention may be made of zinc chloride on pumice, alumina, pumice alone, cuprous chloride, manganous chloride and activated carbon.

I have found that this reaction will proceed satisfactorily with the reactant gases at substantially atmospheric pressure. In the presence of a catalyst such as listed above some conversion of alcohol to alkyl chloride in the mixed vapors will take place at any temperature. However, a substantial conversion does not take place below 150° C.; at 170° C. a conversion of about 21% based on the alcohol was obtained. The upper temperature limit of this reaction depends only on the ability of the catalyst to stand up at high temperatures and upon the lower limit of stability of the alcohol to thermal decomposition. I have found in general that the best results are secured if the reactant zone and catalyst are maintained within a range of from 300° C. to 450° C. by external heating. I have found that the best results are secured with a gas mixture containing equimolecular proportions of methanol and hydrogen chloride, but I do not wish to be limited to this proportion since I have found that one or the other may be maintained in excess and a satisfactory reaction will still be secured. I have further found that within the temperature limits noted above methyl chloride will be formed at any space velocity or rate at which the gases are passed in contact with the catalyst. This rate is determined by the degree of activity of the catalyst and the specific temperature used, being greater the higher the temperature and the more active the catalyst.

In carrying out this process the reaction gas mixture containing methanol and hydrogen chloride may be prepared in any convenient method, such as forming methanol and hydrogen chloride vapors separately and then mixing just before passing over the catalyst, or a mixture of vapors may be prepared in a containing holder, or hydrogen chloride may be dissolved in the liquid alcohol to form a mixture containing about 54% HCl and this mixture vaporized. I have found this last method satisfactory.

As an example of operation of this invention the following example is given:

Example

A continuous stream of hydrogen chloride-methanol vapors mixed in approximately equimolecular amounts was preheated to about 180° C. and then passed at substantially atmospheric pressure into contact with previously ignited granular alumina gel of 8 to 12 mesh which was packed in a converter maintained at a temperature of 340° to 350° C. by an electric heating coil around the converter. The mixed hydrogen chloride-methanol vapors were passed through the converter at a rate corresponding to a methanol space velocity of about 275 cu. ft. per hour per cu. ft. of gross catalyst volume (gas volume calculated on the basis of normal temperature and pressure —0° C., 760 mm.). The hot gases leaving the converter were then passed through a suitable train of apparatus to purify and collect the methyl chloride produced. The yield of methyl chloride based on the alcohol used averaged about 95% of theoretical.

As stated above I do not wish to be limited to any particular alcohol, space velocity, reaction temperature, proportions, etc. except as required by the appended claims.

I claim:

1. The process which comprises passing equimolecular proportions of methanol and hydrogen chloride vapors over granular ignited alumina gel maintained at a temperature of 340–350° C.

2. The process which comprises passing an alcohol of the group consisting of methyl and ethyl, and hydrogen chloride vapors over alumina maintained at a temperature of 150–350° C.

3. The process which comprises passing methanol and hydrogen chloride vapors over alumina maintained at a temperature of 150–350° C.

4. The process which comprises passing methanol and hydrogen chloride vapors over alumina maintained at a temperature of 340–350° C.

5. The process of claim 4 in which the vapors are preheated to about 180° C.

6. The process which comprises passing methanol and hydrogen chloride vapors over alumina maintained at a temperature of 300–350° C.

7. The process which comprises passing ethanol and hydrogen chloride vapors over alumina maintained at a temperature of 150–350° C.

Signed at Niagara Falls, in the county of Niagara and State of New York, this 19th day of August, A. D. 1927.

PAUL JOHNSON CARLISLE.